W. H. GODBEY, Jr.
LOCK FOR AUTOMOBILES.
APPLICATION FILED AUG. 20, 1918.
1,377,124.
Patented May 3, 1921.
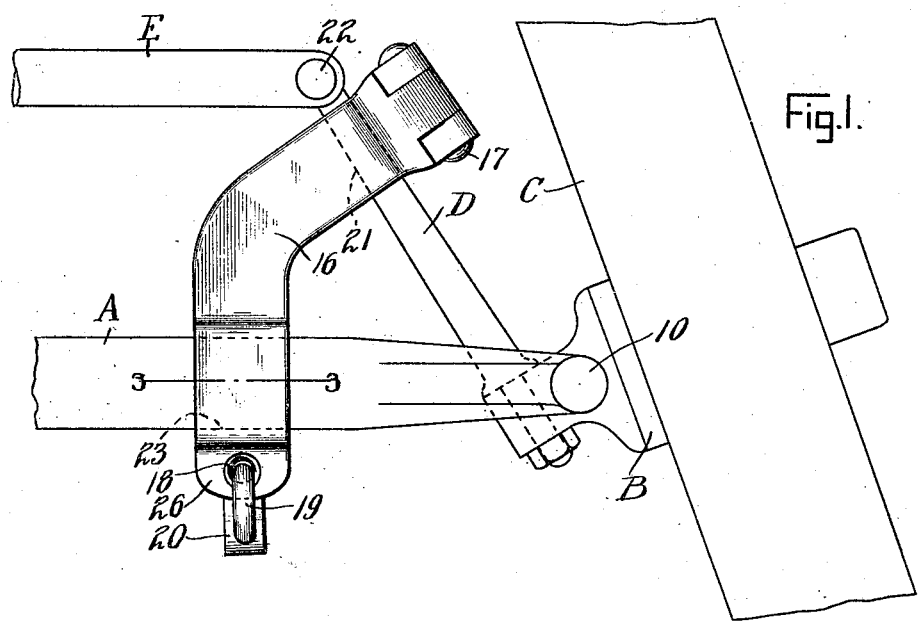
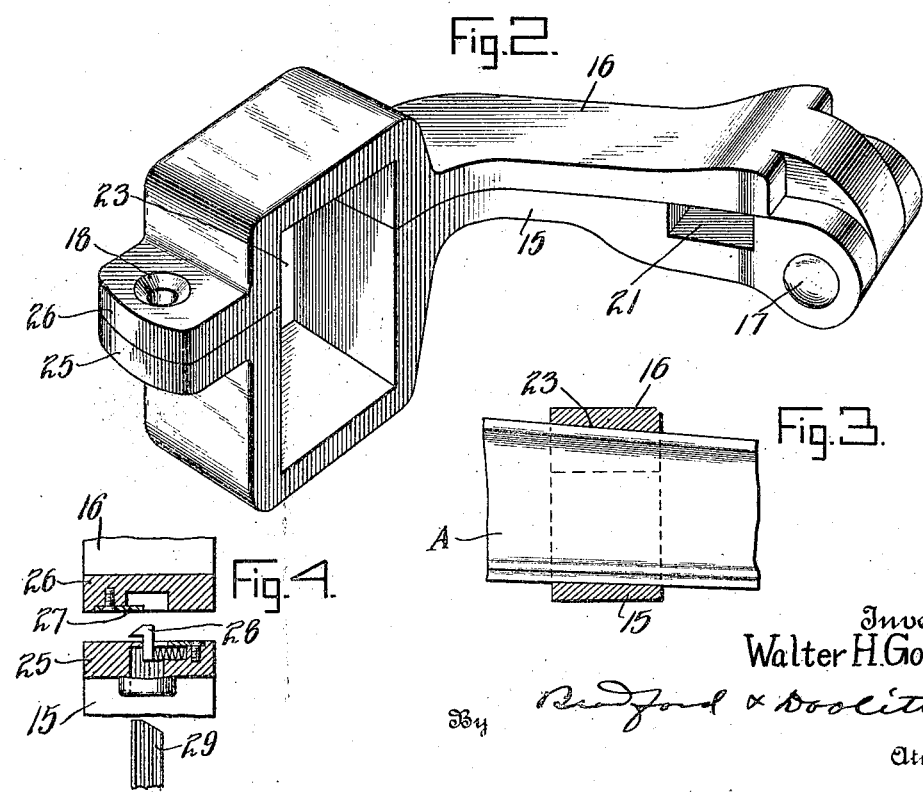
Inventor
Walter H. Godbey, Jr.
By Bedford & Doolittle
Attorneys

UNITED STATES PATENT OFFICE.

WALTER H. GODBEY, JR., OF MEMPHIS, TENNESSEE, ASSIGNOR OF ONE-THIRD TO GEORGE H. HYATT, OF MEMPHIS, TENNESSEE, AND ONE-THIRD TO ANDREW D. GWYNNE, OF DALLAS, TEXAS.

LOCK FOR AUTOMOBILES.

1,377,124.  Specification of Letters Patent.  Patented May 3, 1921.

Application filed August 20, 1918. Serial No. 250,693.

*To all whom it may concern:*

Be it known that I, WALTER H. GODBEY, Jr., a citizen of the United States, residing at Memphis, Shelby county, and State of Tennessee, have invented and discovered certain new and useful Improvements in Locks for Automobiles, of which the following is a specification.

The object of my said invention is to provide an inexpensive and at the same time a very secure lock for automobiles and one that is convenient to use, whereby the automobile may be secured against theft, or use, while the lock is attached, all as will be hereinafter more fully described and claimed.

Referring to the accompanying drawings, which are made a part hereof and on which similar reference characters indicate similar parts, Figure 1 is a top or plan view of the end of an axle with a portion of a wheel, a portion of the steering gear and the lock, showing the several parts in the position they occupy when the lock is applied, Fig. 2 a perspective view showing the clamp device which forms the main part of the lock, Fig. 3 a detail section on the dotted line 3—3 on Fig. 1, and Fig. 4 a detail sectional view showing a modified form.

In said drawings the portion marked A represents the automobile axle; B the wheel spindle bracket; C the wheel; D the arm connected with the spindle bracket at one end and to the steering rod at the other; and E said steering rod. All of the parts above named are of any approved construction and arrangement and need no special description. The bracket B is connected to the axle A by a pivot 10 in the usual manner and the arm D is connected to said bracket B on the opposite side of the pivot 10 from the wheel C.

The clamp which forms the leading part of my invention, comprises two members 15 and 16, hinged together by a pintle 17 at one end and having mating flanges 25 and 26 through which a perforation 18 extends at their other ends, in which the staple member 19 of an ordinary pad-lock 20 may be inserted. A recess 21 is formed in the member 15 adjacent to the hinge which is adapted to embrace and hold the arm D near its pivotal connection 22 with the steering rod E. The opposite ends of said members 15 and 16 are formed so that when they are together they will provide the socket 23 to embrace the axle A.

It will be understood of course that the parts will be shaped to conform to the shape of the member of the steering gear and of the axle of the particular car with which it is designed for use; and may be of some shape that will adapt the lock for use with any car; and other modifications in the details of construction may be made without departing from my said invention.

In Fig. 4 I have shown a lock formed in the flanges 25 and 26, a keeper 27 on the one part being adapted to be engaged by a spring latch 28 on the other, and a key 29 provided for unlocking the parts. This is but one form of lock of many that will readily suggest themselves to those skilled in the art, and is shown only to illustrate different types of locks that may be formed suitable for the purpose.

In use, after the car is stopped in position where it is desired to leave it for a time, the wheel is turned, as shown in Fig. 1, so that the axle A and steering lever D will be in a position to embrace said steering lever and the socket 23 embrace the axle. The clamp is then placed in a position to embrace these parts and the pad-lock 20 applied, or the parts secured by any other form of lock that may be preferred. It will thus be seen that the car cannot be used while the clamp is secured as the car will turn in a circle.

It will be understood, of course, that any type of padlock may be used.

Having thus fully described my said invention what I claim as new and desire to secure by Letters Patent, is:—

The combination with an axle and steering arm pivoted and standing normally substantially perpendicular thereto, of a lock formed of two hinged jaw members, the upper member having a recess formed on its free end and a flange extending therefrom, the lower member having a recess registering with that of the upper member but of greater depth, the two recesses forming a housing for the axle, said lower member provided with a flange extending therefrom and in complement with the upper said flange, means for locking the flanges when brought together, the lower member formed with a recess in its hinged end adapted to receive the steering arm when swung at an angle less than 90° with the axle, the recess being closed by the under face of the upper hinged member, the upper and lower members having their inner faces in contact except at the recessed portions, said members being hinged at a point below their plane of contact and having their rearward part bent to throw the rear recess in alinement with the steering arm.

In witnesses whereof, I have hereunto set my hand and seal at Memphis, Tenn., this 29 day of July, A. D. nineteen hunderd and eighteen.

WALTER H. GODBEY, JR. [L. S.]

Witnesses:
J. A COVINGTON,
JOHN W. FARLEY.